Oct. 11, 1938.  E. R. WITZEL ET AL  2,132,815
PRIME MOVER DYNAMO PLANT
Filed May 14, 1937    3 Sheets-Sheet 3

INVENTOR.
EARL R. WITZEL.
REUBEN L. HUMBERT.
BY
Lyman C. Conger
ATTORNEY

Patented Oct. 11, 1938

2,132,815

UNITED STATES PATENT OFFICE 2,132,815

PRIME MOVER DYNAMO PLANT

Earl R. Witzel and Reuben L. Humbert, Kohler, Wis.

Application May 14, 1937, Serial No. 142,582

17 Claims. (Cl. 290—34)

Our invention relates to improvements in prime mover dynamo plants, and the objects of our invention are, first, to provide means for starting the prime mover by remote control; second, to provide such starting means whereby the prime mover may be started on one fuel and automatically transferred to another fuel for running; and third, to provide means for returning said starting means to the initial position upon the stopping of the prime mover.

Figure 1:
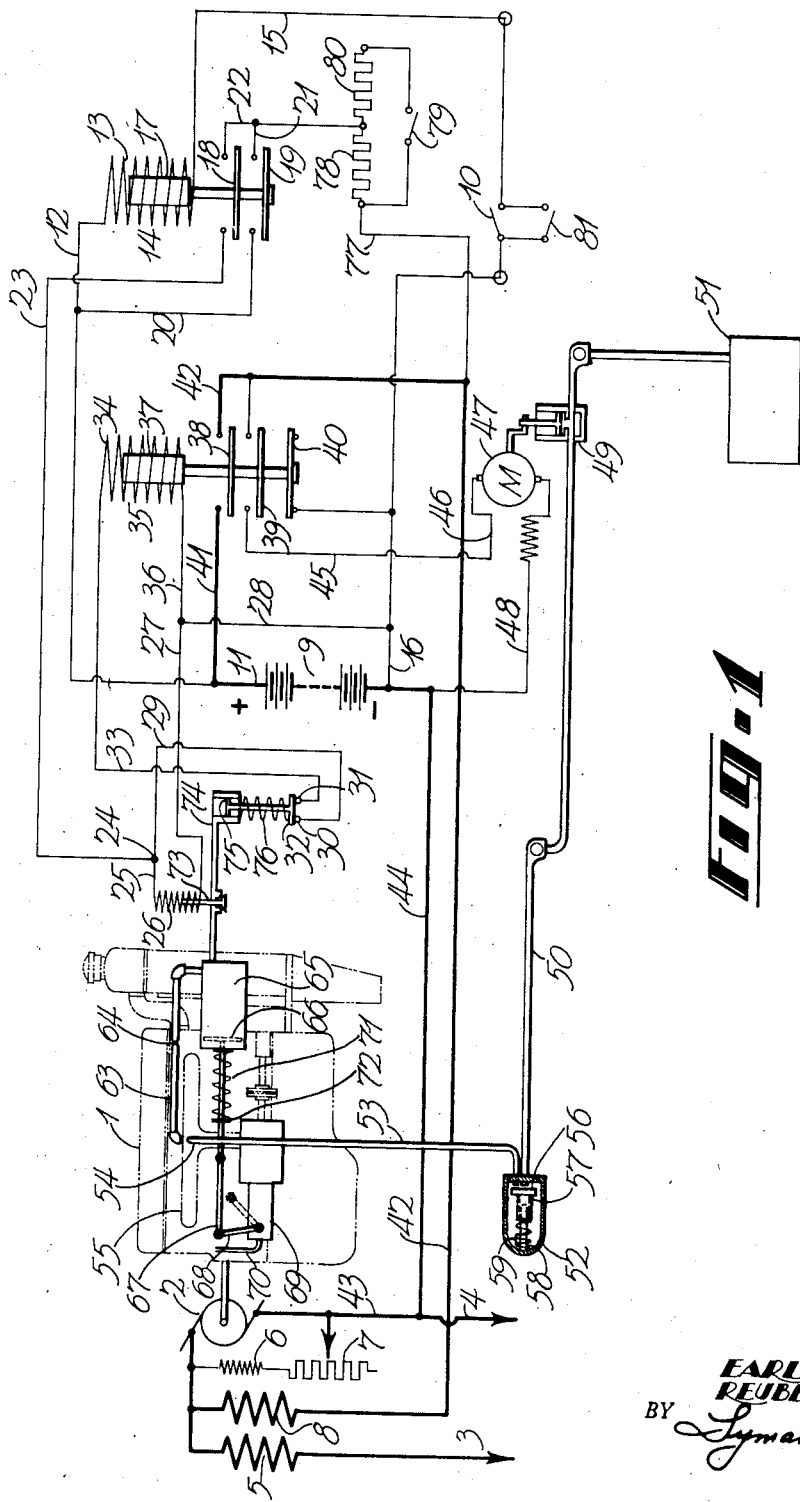
Figure 2:
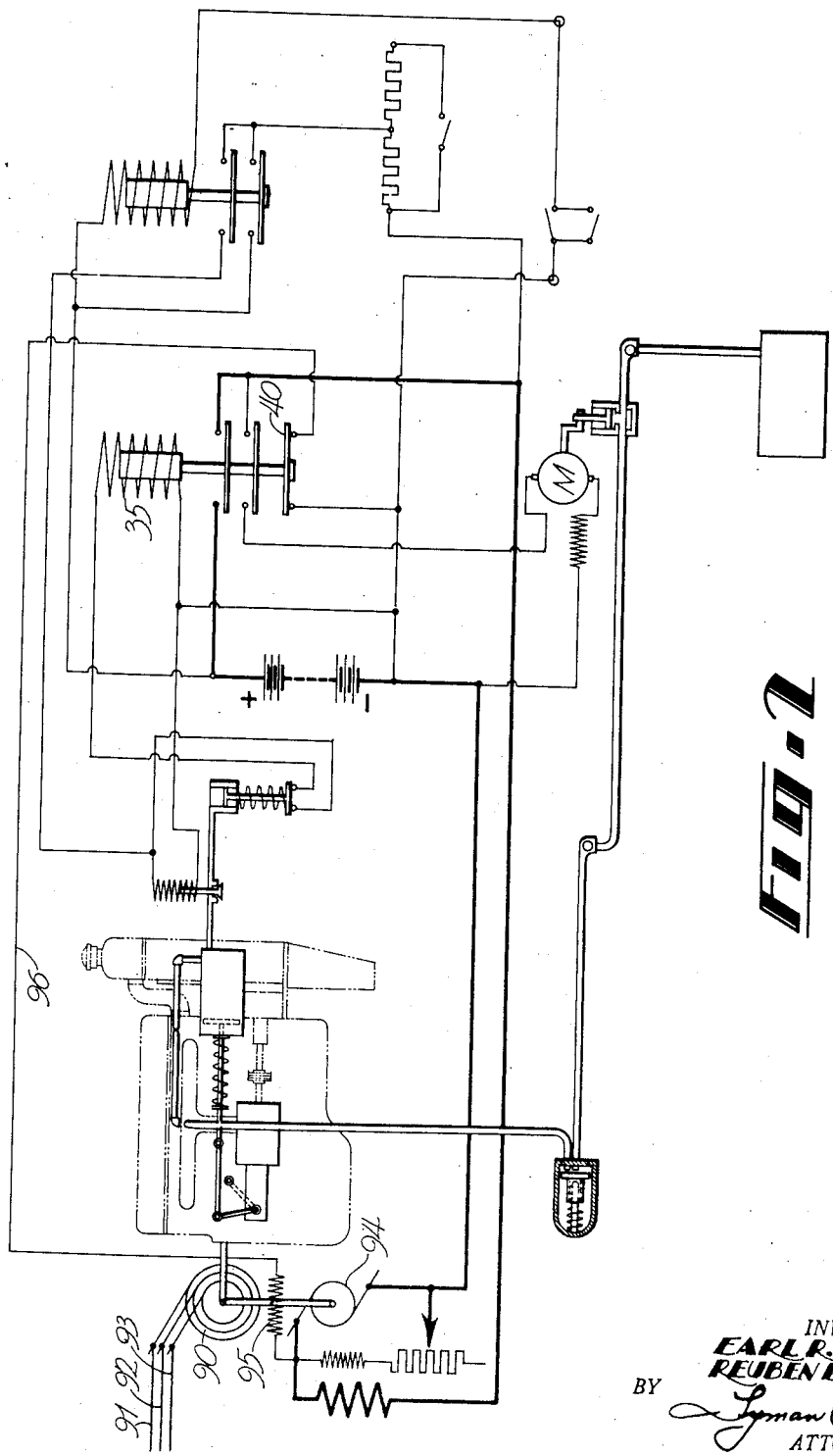
Figure 3:
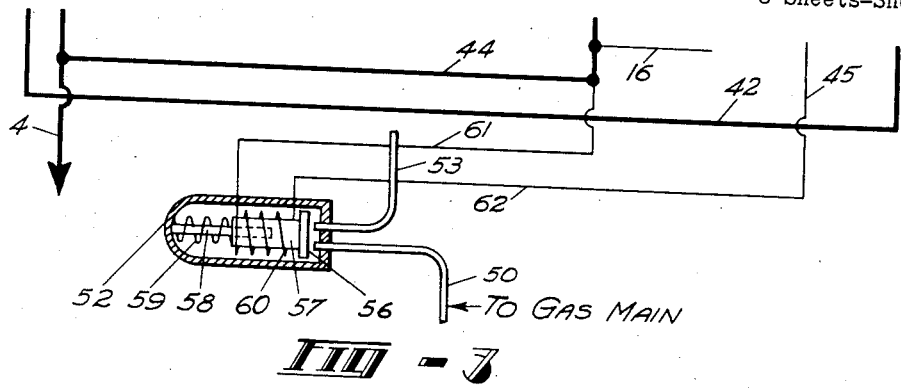

We accomplish these and other related objects by the mechanism and circuits illustrated in the accompanying drawings, in which Figure 1 is a diagrammatic view of the system as applied to a direct current dynamo; Figure 2, a diagrammatic view of the starting circuit as applied to an alternating current dynamo; Figure 3, a fragmentary view showing a modification to adapt the system to the use of gaseous fuel, and Figures 4 and 5, fragmentary views showing modifications of the cranking circuit opening means.

In the drawings the numeral 1 indicates a prime mover. Our invention is particularly, though not exclusively, adapted for use in connection with internal combustion engines operating on fuel oil and started on a more volatile fuel such as gasoline or gas.

In the embodiment shown in Figure 1, illustrating the application of the system to a direct current generating system, the prime mover 1 is coupled in any suitable manner to the electrical generator 2 which is adapted to deliver current to the line or load connections 3 and 4.

The generator 2 may be of any suitable type, such as the compound wound generator illustrated, which is provided with the series field winding 5 and the shunt field winding 6 having the conventional variable resistance 7 in series therewith. In the preferred embodiment of the invention the generator 2 is provided with an additional series winding 8 or cranking winding which, when energized as hereinafter described, operates the generator 2 as a motor to crank the prime mover 1. Although a separate winding for cranking is illustrated, it will be obvious that the regular field windings of the generator may be used for this purpose or a separate starting motor may be substituted for the cranking series winding 8 the same being well recognized in the art as equivalents, as shown by U. S. Patent No. 1,202,632 granted October 24, 1916, to Earl R. Witzel, and U. S. Patent No. 1,448,190 granted March 13, 1923, to William W. Bucher.

A storage battery 9 provides the electric current for cranking the prime mover.

The prime mover is placed in operation by the control switch 10 which may be a manually operated switch or an electrically operated relay and may be placed in close proximity to the plant or at any convenient point remote therefrom.

The closing of the control switch 10 closes a circuit from the battery 9 through leads 11 and 12, coil 13 of control relay 14, lead 15, switch 10 and lead 16 to battery 9.

The relay 14 is provided with a magnetic core 17 having armatures 18 and 19 of electrically conducting material attached thereto and insulated from each other.

When the coil 13 is energized the core 17 is drawn up and the armature 19 closes a circuit from lead 12 through lead 20, armature 19, leads 21 and 22, armature 18, which is also closed by the energization of coil 13, and lead 23 to terminal 24. From this point the circuit branches into two parallel circuits, one through lead 25, coil 26 of the electro-magnetic air valve 73, and leads 27, 28 and 16 to battery 9 and the other through lead 29, contacts 30 and 31 of vacuum switch 32, lead 33, coil 34 of cranking relay 35 and leads 36, 28 and 16 to battery 9.

The energization of coil 34 of cranking relay 35 causes the core 37 together with attached armatures 38, 39 and 40 to be drawn up. This closes a circuit through leads 11 and 41, armature 38, lead 42, cranking series winding 8, armature of generator 2, return to battery over leads 43 and 44.

It also closes a parallel circuit through leads 45 and 46, motor 47 and return to battery over leads 48 and 44. The motor 47 is connected to the priming pump 49 which is interposed in the supply line 50 leading from the starting fuel tank 51 to the spring loaded check valve 52. A supply line 53 leads from the check valve 52 to the priming nozzle 54 which is adapted to discharge a fine spray into the manifold 55. Thus the prime mover is provided, during the starting period, with a volatile fuel such as gasoline to facilitate the starting.

The check valve 52 comprises a disc 56 adapted to fit over and close the ends of the supply lines 50 and 53. The disc 56 is mounted on the sleeve 57 which in turn is slidably mounted on the shaft 58. A spring 59, abutting the sleeve 57, tends to keep the disc 56 in contact with the ends of the supply lines 50 and 53. Thus the valve remains closed except when the pump 47 is in operation and creates a pressure sufficient to overcome the pressure of the spring 59. The purpose of the valve 52 is to prevent the partial vacuum created in the manifold 55 during the operation of the prime mover from causing fuel from the tank 51 to continue to feed, thus discharging the tank 51.

In case the starting fuel is gas such as illuminating gas or natural gas, the tank 51, motor 47 and pump 49 are dispensed with and the supply line 50 connected to the source of gas supply. In this case the valve 52 is provided with an electro-magnetic coil 60, shown in Figure 3, connected by leads 61 and 62 to leads 48 and 46, respectively. The coil 60 is constructed to exert sufficient magnetic force to overcome the pressure of the spring 59 and open the valve.

When the prime mover begins to operate by internal combustion a partial vacuum is created in the manifold 55 which acts through the connection 63, provided with the restricted opening 64, to create a partial vacuum within the vacuum cylinder 65. The vacuum cylinder 65 is provided with the piston 66 which is connected to the piston rod 67 which is, in turn, pivotally connected to the control lever 68 of a fuel injection pump 69 which operates to force fuel from the supply line 70 into the prime mover to supply the running fuel, ordinarily fuel oil, thereto. The fuel pump, being of a type well known in the art and forming no part of the present invention, is not specifically described or illustrated herein.

The vacuum created in the vacuum cylinder 65 causes the piston 66 to be drawn forward against the compression of the spring 71 which is interposed between the vacuum cylinder 65 and a collar 72 attached to the piston rod 67, thus actuating the control lever 68 and placing the fuel injection pump 69 in operation.

As the piston 66 nears the end of the vacuum cylinder 65 the vacuum within the cylinder rises quickly. The electro-magnetic air valve 73, being in a closed position, due to the fact that the coil 26 is energized, the vacuum extends into the connection 74 between the vacuum cylinder 65 and the vacuum switch 32, and acts on the piston 75 to raise the switch 32 against the pressure of the spring 76, thus breaking the circuit between contacts 30 and 31.

The breaking of the circuit between contacts 30 and 31 de-energizes the coil 34, allows the core 37 to drop thus opening the circuit through the cranking series field 8 and also opening the circuit through the motor 47, thus terminating the cranking period and the feeding of fuel through the nozzle 54.

The plant is thus in a running position, operating solely on fuel delivered by the pump 69, and delivering current over the leads 3 and 4, and the battery 9 is receiving a trickle charge through leads 42 and 77, resistance 78, leads 22 and 21, armature 19, leads 20 and 12 to battery, thence through leads 44 and 43 to generator armature. A parallel circuit, closed by a switch 79, through a resistance 80 provides a means of increasing the charging rate if desired.

Opening of the switch 10 de-energizes the coil 13 of control relay 14 allowing the armature 19 to drop and open the circuit through the coil 26 of electro-magnetic air valve 73, causing it to open and admit air to the vacuum cylinder 65. The spring 71 then returns the piston 66 to its original position actuating the control lever 68 and disabling the fuel pump 69, causing the prime mover to stop.

Any number of auxiliary switches, such as switch 81, may be connected in parallel with switch 10 and placed at any convenient distance from the plant.

All equipment is thus returned to its original position ready to repeat the cycle.

Figure 4:
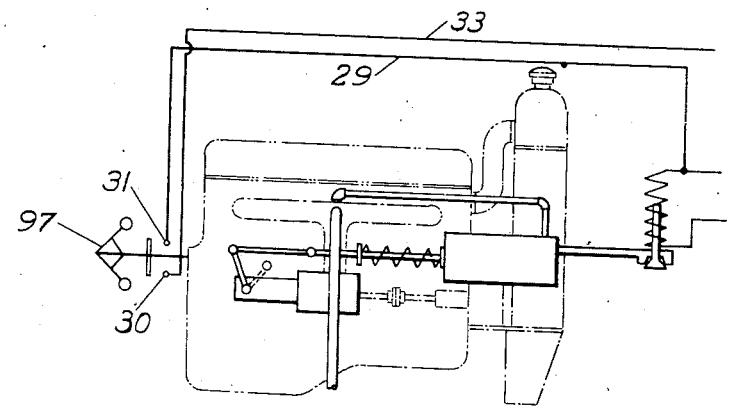
Figure 5:
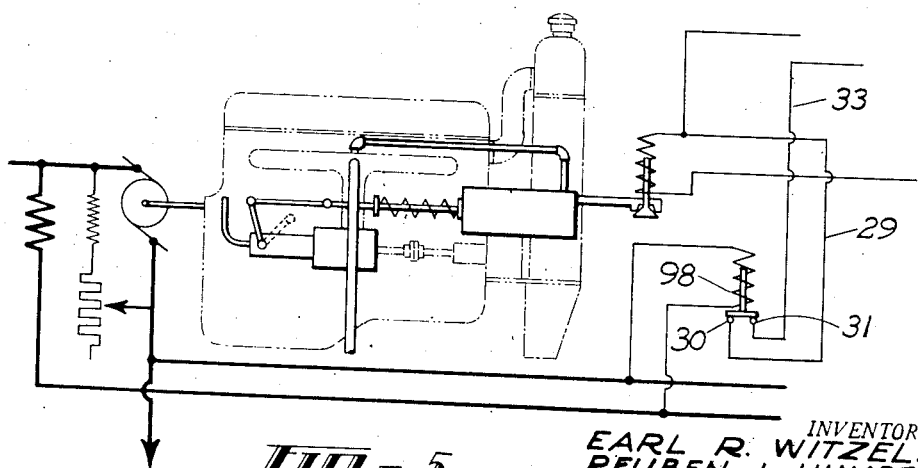

Although we prefer to use a vacuum switch for opening the circuit between contacts 30 and 31, equivalent means such as a centrifugal governor 97, as shown in Figure 4, or a potential coil 98, as shown in Figure 5, in circuit with the load and designed to operate upon the generator attaining a certain voltage, may be used.

The system may be adapted to an alternating current generator as illustrated in Figure 2 in which the numeral 90 indicates an alternating current generator having load leads 91, 92 and 93 and coupled to a direct current exciter 94 to which the electrical connections are made and which acts as a cranking motor during the starting phase.

Provision is made for opening the field 95 of the alternator during the cranking phase by connecting it through armature 40 of the cranking relay 35, as by lead 96, thus when the cranking relay 35 is raised during the cranking phase the circuit through the field 95 is open.

It will be understood that the specific disclosure herein is made for the purpose of illustration only and that the invention is not restricted to the specific details illustrated or described or otherwise than by the appended claims.

We claim:

1. In a prime mover dynamo plant, means for starting and stopping said prime mover comprising, in combination, electrically operated means for cranking said prime mover; a battery; a cranking circuit comprising said cranking means and said battery; a cranking relay adapted to close said cranking circuit when energized and to open said cranking circuit when de-energized; a cranking relay circuit comprising said cranking relay and said battery; a control relay adapted to close said cranking relay circuit when energized and to open said cranking relay circuit when de-energized; means actuated by vacuum produced in the manifold of said prime mover for opening said cranking relay circuit to de-energize said cranking relay when the prime mover is operating under its own power; a control relay circuit comprising said battery, said control relay and a control switch; means for feeding a priming fuel to said prime mover during the cranking thereof; means for supplying a running fuel to said prime mover; means for disabling said running fuel supply means during the cranking of said prime mover, and means actuated by vacuum produced in the manifold of said prime mover for placing said running fuel supply means in operation upon operation of the prime mover under its own power and means for disabling said priming fuel feeding means concurrently with the initiation of operation of said running fuel supply means.

2. In a prime mover dynamo plant, means for starting and stopping said prime mover comprising, in combination, electrically operated means for cranking said prime mover; a battery; a cranking circuit comprising said cranking means and said battery; a cranking relay adapted to close said cranking circuit when energized and to open said cranking circuit when de-energized;

a cranking relay circuit comprising said cranking relay and said battery; a control relay adapted to close said cranking relay circuit when energized and to open said cranking relay circuit when de-energized; means for opening said cranking relay circuit to de-energize said cranking relay when the prime mover is operating under its own power; a control relay circuit comprising said battery, said control relay and a control switch; means for feeding a priming fuel to said prime mover during the cranking thereof; means for supplying a running fuel to said prime mover; means for disabling said running fuel supply means during the cranking of said prime mover, and means actuated by vacuum produced in the manifold of said prime mover for placing said running fuel supply means in operation upon operation of the prime mover under its own power and means for disabling said priming fuel feeding means concurrently with the initiation of operation of said running fuel supply means.

3. In a prime mover dynamo plant, means for starting and stopping said prime mover comprising, in combination, electrically operated means for cranking said prime mover; a battery; a cranking circuit comprising said cranking means and said battery; a cranking relay adapted to close said cranking circuit when energized and to open said cranking circuit when de-energized; a cranking relay circuit comprising said cranking relay and said battery; a control relay adapted to close said cranking relay circuit when energized and to open said cranking relay circuit when de-energized; means for opening said cranking relay circuit to de-energize said cranking relay when the prime mover is operating under its own power; a control relay circuit comprising said battery, said control relay and a control switch; means for feeding a priming fuel to said prime mover during the cranking thereof; means for supplying a running fuel to said prime mover; means for disabling said running fuel supply means during the cranking of said prime mover, and means for placing said running fuel supply means in operation upon operation of the prime mover under its own power and means for disabling said priming fuel feeding means concurrently with the initiation of operation of said running fuel supply means.

4. In a prime mover dynamo plant, means for starting and stopping said prime mover comprising, in combination, electrically operated means for cranking said prime mover; a battery; a cranking circuit comprising said cranking means and said battery; a cranking relay adapted to close said cranking circuit when energized and to open said cranking circuit when de-energized; a cranking relay circuit comprising said cranking relay and said battery; a control relay adapted to close said cranking relay circuit when energized and to open said cranking relay circuit when de-energized; means for opening said cranking relay circuit to de-energize said cranking relay when the prime mover is operating under its own power; a control relay circuit comprising said battery, said control relay and a control switch; and means for feeding a priming fuel to said prime mover during the cranking thereof comprising a fuel pump, a motor adapted to drive said fuel pump, a motor circuit comprising said motor and said battery, said motor circuit being closed by said cranking relay when said cranking relay is energized and opened by said cranking relay when said cranking relay is de-energized.

5. In a prime mover dynamo plant, means for starting said prime mover comprising, in combination, electrically operated means for cranking said prime mover; a battery; a cranking circuit comprising said cranking means and said battery; means for feeding a priming fuel to said prime mover during the cranking thereof and comprising a fuel supply tank; a fuel supply line from said fuel supply tank to said prime mover; a fuel pump in said supply line; a check valve in said supply line interposed between said prime mover and said fuel pump, normally closed but adapted to be opened by the pressure of fuel delivered by said pump; a motor adapted to drive said fuel pump; a motor circuit comprising said motor and said battery, and means for simultaneously closing and simultaneously opening said cranking circuit and said motor circuit.

6. In a prime mover dynamo plant, means for starting said prime mover comprising, in combination, electrically operated means for cranking said prime mover, a battery, a cranking circuit comprising said cranking means and said battery, means for feeding a priming fuel to said prime mover during the cranking thereof and comprising a priming fuel supply line to said prime mover, a check valve interposed in said supply line, a spring normally holding said check valve closed, an electro-magnetic coil wound to oppose the effect of said spring and, when energized, sufficient to overcome the action of said spring and to open said check valve, and means for simultaneously closing and simultaneously opening said cranking circuit, and a circuit from said battery through said electromagnetic coil.

7. In a prime mover dynamo plant, means for starting said prime mover comprising, in combination, electrically operated means for cranking said prime mover, a battery, a cranking circuit comprising said cranking means and said battery, means for feeding a priming fuel to said prime mover during the cranking thereof and comprising, a fuel pump, a motor adapted to drive said fuel pump, a motor circuit comprising said motor and said battery and means for simultaneously closing and simultaneously opening said cranking circuit and said motor circuit.

8. In a prime mover dynamo plant, means for starting said prime mover comprising, in combination, electrically operated means for cranking said prime mover, a battery, a cranking circuit comprising said cranking means and said battery, means for feeding a priming fuel to said prime mover during the cranking thereof and comprising a priming fuel pump, a motor adapted to drive said priming fuel pump, a motor circuit comprising said motor and said battery, means for simultaneously closing and opening said cranking circuit and said motor circuit, means for supplying a running fuel to said prime mover, means for disabling said running fuel supply means during the cranking of said prime mover and means actuated by vacuum produced in the manifold of said prime mover for placing said running fuel supply means in operation upon operation of the prime mover under its own power.

9. In a prime mover dynamo plant, means for starting said prime mover comprising, in combination, electrically operated means for cranking said prime mover, a battery, a cranking circuit comprising said cranking means and said battery, means for feeding a priming fuel to said prime mover during the cranking thereof and comprising a priming fuel pump, a motor adapted to drive said priming fuel pump, a motor circuit comprising said motor and said battery, means for simultaneously closing and opening said cranking circuit and said motor circuit, means for supplying a running fuel to said prime mover, means for disabling said running fuel supply means during the cranking of said prime mover and means for placing said running fuel supply means in operation upon operation of the prime mover under its own power.

10. In a prime mover dynamo plant, means for stopping said prime mover comprising, in combination, a control circuit comprising a switch, means for supplying an operating fuel to said prime mover, control means therefor, means actuated by vacuum created by the operation of said prime mover for actuating said control means whereby to place said fuel supply means in operation, means actuated by the opening of said control circuit for disabling said control actuating means, and means for returning said control means to its original position upon the disablement of said control actuating means.

11. In a prime mover dynamo plant, means for starting and stopping said prime mover comprising, in combination, means for supplying a priming fuel to said prime mover during the starting thereof, means for discontinuing said priming fuel supply upon the operation of said prime mover under its own power, a control circuit comprising a switch, means for supplying an operating fuel to said prime mover, control means therefor, means actuated by vacuum caused by the operation of said prime mover for actuating said control means whereby to place said operating fuel supply means in operation, means actuated by the opening of said control circuit for disabling said control actuating means, and means for returning said control means to its original position upon the disablement of said control actuating means.

12. In a prime mover dynamo plant, means for stopping said prime mover comprising, in combination, a control circuit comprising a switch, a pump adapted to supply an operating fuel to said prime mover, a control lever adapted to start and stop said fuel supply pump, a vacuum cylinder, a connection between said cylinder and the intake manifold of said prime mover, a piston in said cylinder, a connection between said piston and said control lever whereby a vacuum in said vacuum cylinder causes said piston to move said control lever to a position to start said fuel supply pump, a connection between the interior of said vacuum cylinder and the exterior atmosphere, a valve adapted to close said connection, an electromagnetic coil in said control circuit adapted to close said valve when energized, said valve returning to an open position to admit air to said cylinder upon de-energization of said electromagnetic coil, and means for returning said piston to its original position upon cessation of vacuum in said vacuum cylinder whereby to move said control lever to a position to stop said fuel supply pump.

13. In a prime mover dynamo plant, means for starting and stopping said prime mover comprising, in combination, a control circuit comprising a switch, a battery, and a control relay, said control relay being adapted to be closed by the closing of said control circuit and opened by the opening of said control circuit; a cranking relay circuit adapted to be closed by the closing of said control relay and opened by the opening of said control relay and comprising said battery and a cranking relay adapted to be closed by the closing of said cranking relay circuit and opened by the opening of said cranking relay circuit; a cranking circuit adapted to be closed upon closing of said cranking relay and opened upon opening of said cranking relay and comprising said battery and electrically operated means for cranking said prime mover; an auxiliary circuit adapted to be closed upon the closing of said cranking relay and to be opened upon the opening of said cranking relay, a motor in said auxiliary circuit, a priming fuel pump coupled to said motor and adapted to be actuated thereby, a fuel supply connection from said priming fuel pump to said prime mover, a running fuel supply pump, a control lever therefor, control lever actuating means actuated by the vacuum produced by the operation of said prime mover for actuating said control lever to start said running fuel pump and means operable upon opening of said control circuit for returning said control lever actuating means to its original position whereby to stop said running fuel pump.

14. The combination with an internal combustion engine of electrically operated means for cranking said engine, means for feeding a priming fuel to said engine, means for feeding a running fuel to said engine, means for causing said priming fuel means to be operative during the cranking of the engine, means for causing said running fuel means to be inoperative during the aforesaid cranking period, means for causing said running fuel means to be operative upon running of the engine under its own power, and means for causing said priming fuel means to be inoperative during said running period.

15. The combination with an internal combustion engine of electrically actuated means for cranking said engine, means for feeding a running fuel to said engine, means operative concurrently with said cranking means for feeding a priming fuel to said engine, means for disabling said fuel feeding supply means during the cranking of said engine, and means for placing said running fuel supply means in operation upon operation of the engine under its own power.

16. The combination with an internal combustion engine of electrically actuated means for cranking said engine, means for feeding a priming fuel to said engine during the cranking thereof, means for supplying a running fuel to said engine, means for disabling said running fuel supply means during the cranking of said engine, means for placing said running fuel supply means in operation upon operation of the engine under its own power, and means for disabling said priming fuel feeding means concurrently with the initiation of operation of said running fuel supply means.

17. The combination with an internal combustion engine of electrically actuated means for cranking said engine, electrically actuated means in circuit with said cranking means for feeding a priming fuel to said engine, means for supplying a running fuel to said engine, means for disabling said running fuel supply means during the cranking of said engine, and means for placing said running fuel supply means in operation upon operation of the engine under its own power.

EARL R. WITZEL.
REUBEN L. HUMBERT.